United States Patent
Kim et al.

(10) Patent No.: US 8,817,097 B2
(45) Date of Patent: Aug. 26, 2014

(54) APPARATUS FOR PROCESSING ON-SCREEN DISPLAY AND SYSTEM FOR REPROGRAMMING CAMERA MODULE HAVING THE SAME

(75) Inventors: Gyu Won Kim, Gyunggi-do (KR); In Taek Song, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 452 days.

(21) Appl. No.: 13/166,280

(22) Filed: Jun. 22, 2011

(65) Prior Publication Data
US 2012/0257055 A1  Oct. 11, 2012

(30) Foreign Application Priority Data

Apr. 11, 2011  (KR) .................. 10-2011-0033157

(51) Int. Cl.
*H04N 7/18* (2006.01)
*B60Q 1/48* (2006.01)
*G06K 9/00* (2006.01)

(52) U.S. Cl.
USPC .................. 348/148; 340/932.2; 382/104

(58) Field of Classification Search
USPC .................. 348/148; 340/932.2; 382/104
See application file for complete search history.

(56) References Cited

U.S. PATENT DOCUMENTS

| 7,366,595 B1* | 4/2008 | Shimizu et al. | 701/301 |
| 2004/0249564 A1* | 12/2004 | Iwakiri et al. | 701/200 |
| 2005/0169501 A1* | 8/2005 | Fujii et al. | 382/104 |
| 2007/0013495 A1* | 1/2007 | Suzuki et al. | 340/435 |

FOREIGN PATENT DOCUMENTS

| JP | 2008-103825 | 5/2008 |
| KR | 10-2009-0014552 A | 2/2009 |
| KR | 10-2010-0006845 A | 1/2010 |
| KR | 10-2010-0038981 A | 4/2010 |

* cited by examiner

*Primary Examiner* — Dave Czekaj
*Assistant Examiner* — Tsion B Owens
(74) *Attorney, Agent, or Firm* — McDermott Will & Emery LLP

(57) ABSTRACT

There is provided an apparatus for processing an on-screen display (OSD), the apparatus including: a buffer unit receiving first dynamic guideline image information, a color determining unit determining colors for previously divided sections included in the first dynamic guideline image information from the buffering unit, and an image synthesizing unit synthesizing second dynamic guideline image information having the colors for each of the sections, determined by the color determining unit with an image from a camera. With the apparatus for processing an OSD, a user freely sets colors of a warning message, a static guideline, and a dynamic guideline, whereby the warning message, the static guideline, and the dynamic guideline can be displayed on a screen without obscuring a rearview image. In addition, a dynamic guideline can be set as different colors according to sections divided into distances from the rear of a vehicle and an image can be continuously displayed. Further, the camera module can be reprogrammed.

7 Claims, 9 Drawing Sheets

Check Surroundings for Safety!

US 8,817,097 B2

APPARATUS FOR PROCESSING ON-SCREEN DISPLAY AND SYSTEM FOR REPROGRAMMING CAMERA MODULE HAVING THE SAME

CROSS-REFERENCE TO RELATED APPLICATIONS

This application claims the priority of Korean Patent Application No. 10-2011-0033157 filed on Apr. 11, 2011, in the Korean Intellectual Property Office, the disclosure of which is incorporated herein by reference.

BACKGROUND OF THE INVENTION

1. Field of the Invention

The present invention relates to an apparatus for processing an image of on-screen display (OSD) for a vehicle and a system for reprogramming a camera module having the same.

2. Description of the Related Art

An on-screen display (OSD) is generally implemented for an image such as a rearview image for a vehicle, or the like, such that various types of information may be displayed simultaneously therein. This displayed information may include a warning message indicating that an obstacle exists at the rear of the vehicle, a parking guideline serving as a guide at the time of the backward movement of the vehicle, and the like. The parking guideline may include a static guideline constantly displayed in the rearview image regardless of a direction in which the vehicle is moving, a dynamic guideline displaying an expected parking trace according to a direction in which the vehicle is moving, and the like, as a curve.

The apparatus for processing an OSD or the apparatus for displaying an OSD image, according to the related art, has only displayed the warning message, the static guideline, and the dynamic guideline in the rearview image with a single color.

However, since the apparatus for processing an OSD or the apparatus for displaying an OSD image according to the related art has displayed the warning message, the static guideline, and the dynamic guideline with a single color, it may perform a user's various requirements such as changing a color of the guideline or the like. In addition, when the guideline, or the like, is displayed on a screen, it may obscure the rearview image.

The dynamic guideline may not be displayed in different colors according to a distance from the rear of the vehicle and may be interrupted when it is displayed in the rearview image due to OSD information being read from a memory at a low speed. In addition, the warning message, the static guideline, and the dynamic guide may obscure the rearview image.

Further, after a camera module including the apparatus for processing an OSD is mounted in a vehicle, it may not be reprogrammed.

SUMMARY OF THE INVENTION

An aspect of the present invention provides an apparatus for processing an on-screen display (OSD) capable of displaying a warning message, a static guideline, and a dynamic guideline on a screen without obscuring a rearview image by allowing a user to freely set colors of the warning message, the static guideline, and the dynamic guideline. Another object of the present invention provides an apparatus for processing an OSD capable of setting a dynamic guideline to have different colors according to sections divided into distances from the rear of a vehicle and continuously displaying an image.

Another object of the present invention provides a system implemented such that a camera module including the apparatus for processing an OSD may be reprogrammed.

According to an aspect of the present invention, there is provided an apparatus for processing an on-screen display (OSD), the apparatus including: a buffer unit receiving first dynamic guideline image information; a color determining unit determining colors for previously divided sections included in the first dynamic guideline image information from the buffering unit; and an image synthesizing unit synthesizing second dynamic guideline image information having the colors for each of the sections, determined by the color determining unit with an image from a camera.

According to another aspect of the present invention, there is provided an apparatus for processing an on-screen display (OSD), the apparatus including: a buffer unit receiving first static guideline image information, first dynamic guideline image information, and first message image information; a color determining unit including a first color determination unit determining colors for each of sections with respect to the first static guideline image information from the buffering unit, a second color determination unit determining colors for previously divided sections included in the first dynamic guideline image information, and a third color determination unit determining a color of the first message image information; and an image synthesizing unit synthesizing second static guideline image information having the colors for each of the sections determined by the first color determination unit, second dynamic guideline image information having the colors for each of the sections determined by the second color determination unit, and second message image information having the color determined by the third color determination unit with an image from a camera.

The first color determination unit may determine the colors for each of the sections by using horizontal synchronous signals of the first static guideline image information, and the second color determination unit may determine the colors by using section identifying information stored according to the sections included in the first dynamic guideline image information.

The image synthesizing unit may include an active pixel determining unit determining active pixels among the second static guideline image information having the colors for each of the sections determined by the first color determination unit, the second dynamic guideline image information having the colors for each of the sections determined by the second color determination unit, and the second message image information having the color determined by the third color determination unit, the active pixels being synthesized with the image from the camera.

The active pixel determining unit may determine the active pixels and inactive pixels among the second static guideline image information having the colors for each of the sections determined by the first color determination unit, the second dynamic guideline image information having the colors for each of the sections determined by the second color determination unit, and the second message image information having the color determined by the third color determination unit, in a lattice form, the inactive pixels not being synthesized with the image from the camera.

The buffer unit may include: a first buffer receiving the first static guideline image information; a second buffer receiving the first dynamic guideline image information corresponding to a steering wheel steering angle; a third buffer receiving third dynamic guideline image information corresponding to the next steering wheel steering angle estimated from the steering wheel steering angle; and a fourth buffer receiving the first message image information.

The apparatus may further include a first decoder run-length decoding the first static guideline image information from the first buffer to thereby output the decoded first static guideline image information to the color determining unit; a second decoder run-length decoding the first dynamic guideline image information from the second buffer to thereby output the decoded first dynamic guideline image information to the color determining unit; and a third decoder run-length decoding the first message image information from the fourth buffer to thereby output the decoded first message image information to the color determining unit.

The apparatus may further include a color register unit including a first color register providing color information corresponding to the section identifying information to the first color determination unit, a second color register providing color information according to the horizontal synchronous signal to the second color determination unit, and a third color register providing determined color information of the first message image information to the third color determination unit.

The image synthesizing unit may include a synthesizing region filtering unit low pass filtering the second static guideline image information having the colors for each of the sections determined by the first color determination unit, the second dynamic guideline image information having the colors for each of the sections determined by the second color determination unit, and the second message image information having the color determined by the third color determination unit.

The apparatus may further include a position determining unit including a first position determining unit determining a position in which the second static guideline image information having the colors for each of the sections is to be displayed, in the image from the camera and a second position determining unit determining a position in which the second message image information having the determined color is to be displayed, in the image from the camera.

The first position determining unit may determine the position in which the second static guideline image information having the colors for each of the section is to be displayed in the image from the camera by counting horizontal synchronous signals of the first static guideline image information and pixel values of the horizontal synchronous signals, and the second position determining unit may determine the position in which the second message image information having the determined color is to be displayed, in the image from the camera by counting horizontal synchronous signals of the first message image information.

The image synthesizing unit may further include a flicker setting unit set to block synthesizing of the active pixels of the second message image information having the determined color with the image from the camera at a preset time interval.

According to another aspect of the present invention, there is provided a system for reprogramming a camera module, the system including: a camera module including a sensor unit receiving an image from a camera, a buffer unit receiving first dynamic guideline image information, a color determining unit determining colors for previously divided sections included in the first dynamic guideline image information from the buffering unit, and an image synthesizing unit synthesizing second dynamic guideline image information having the colors for each of the sections determined by the color determining unit with the image from the camera; and a first microcontroller unit transmitting data to and receiving data from the camera module in a half-duplex transmission scheme and transmitting data to and receiving data from a computer in a full-duplex transmission scheme.

The color determining unit and the image synthesizing unit may form a second microcontroller unit.

The color determining unit may determine the colors by using section identifying information stored according to the sections included in the first dynamic guideline image information.

The image synthesizing unit may include an active pixel determining unit determining active pixels among the second dynamic guideline image information having the colors for each of the sections, determined by the color determining unit, the active pixels being synthesized with the image from the camera.

The active pixel determining unit may determine the active pixels and inactive pixels among the second dynamic guideline image information having the colors for each of the sections determined by the color determining unit, in a lattice form, the inactive pixels not being synthesized with the image from the camera.

The buffer unit may include: a first buffer receiving the first dynamic guideline image information corresponding to a steering wheel steering angle; and a second buffer receiving third dynamic guideline image information corresponding to the next steering wheel steering angle estimated from the steering wheel steering angle.

The camera module may further include a decoder unit run-length decoding the first dynamic guideline image information from the buffer unit to thereby output the decoded first dynamic guideline image information to the color determining unit.

The camera module may further include a color register unit providing color information corresponding to the section identifying information to the color determining unit.

The image synthesizing unit may include a synthesizing region filtering unit low pass filtering the second dynamic guideline image information having the colors for each of the sections.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
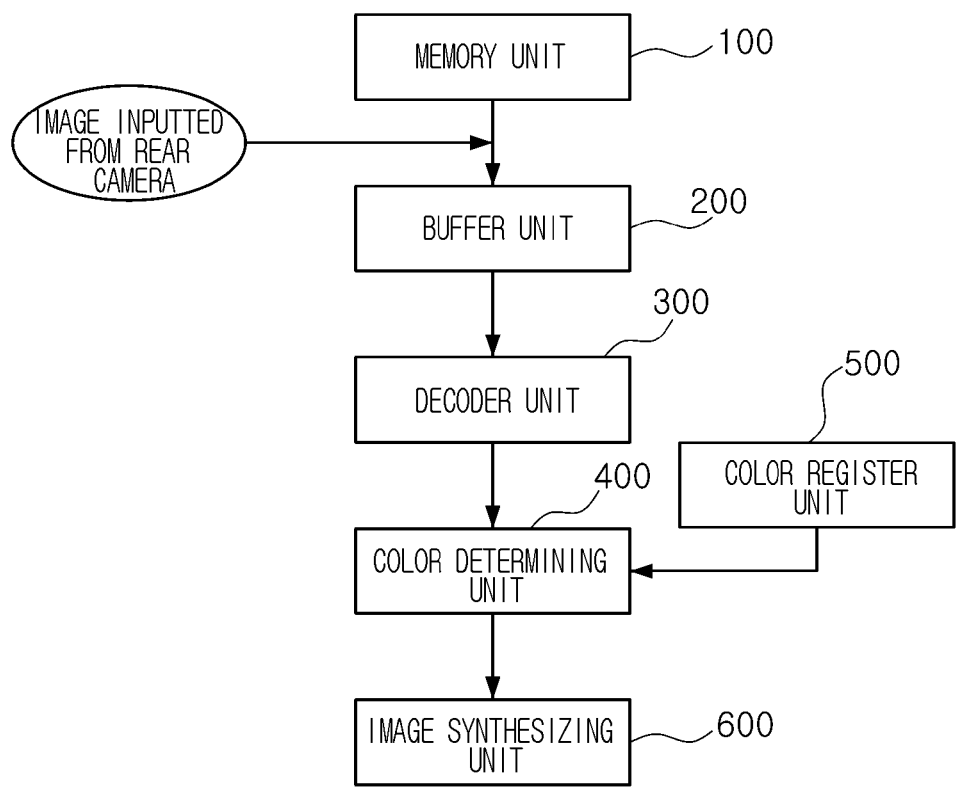
FIG. 1 is a configuration diagram of an apparatus for processing an on-screen display (OSD) according to a first embodiment of the present invention.

Embodiments of the present invention will now be described in detail with reference to the accompanying drawings.

The present invention should not be construed as being limited to the embodiments set forth herein and the embodiments may be used to assist in an understanding of the technical idea of the present invention. Like reference numerals designate like components having substantially the same constitution and function in the drawings of the present invention.

Figure 3:
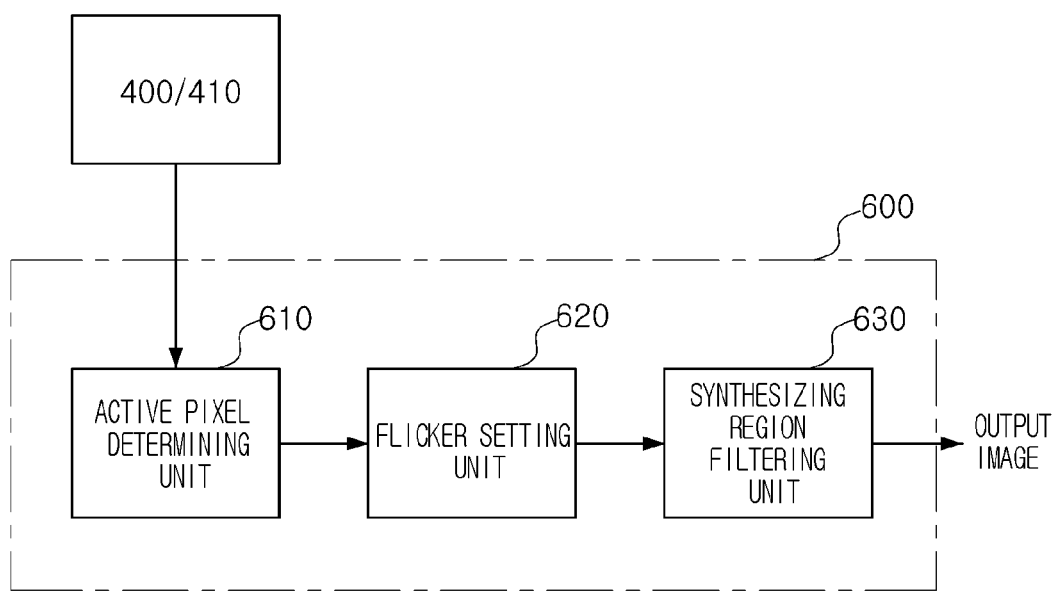
FIG. 3 is a detailed view of an image synthesizing unit according to the embodiment of the present invention.

FIG. 1 is a configuration diagram of an apparatus for processing an on-screen display (OSD) according to an embodiment of the present invention. FIG. 3 is a detailed view of an image synthesizing unit 600.

Referring to FIG. 1, an apparatus for processing an OSD according to a first embodiment of the present invention may include a memory unit 100, a buffer unit 200, a decoder unit 300, a color determining unit 400, a color register unit 500, and an image synthesizing unit 600.

The memory unit 100 may have first dynamic guideline image information stored therein. Here, the first dynamic guideline image information may be information in which a plurality of bitmap images corresponding to a plurality of steering wheel steering angles are encoded. Here, the encoding may be performed by a run length encoding method. In addition, the first dynamic guideline image information may be information in which a guideline is divided into predetermined sections and is encoded together with section identifying information such as section numbers, or the like.

The buffer unit 200 may temporally store the first dynamic guideline image information read from the memory unit 100. Here, the buffer unit 200 may include a first buffer (not shown) receiving the first dynamic guideline image information corresponding to a current steering wheel steering angle and a second buffer (not shown) receiving third dynamic guideline image information corresponding to the next steering wheel steering angle estimated from the current steering wheel steering angle. Alternatively, the buffer unit 200 may include a first buffer (not shown) receiving the first dynamic guideline image information corresponding to the current steering wheel steering angle and a plurality of buffers (not shown) receiving third dynamic guideline image information corresponding to sequential steering wheel steering angles estimated from the current steering wheel steering angle.

The decoder unit 300 may decode the first dynamic guideline image information outputted from the buffer unit 200. Here, the decoding may be performed by a run length decoding method.

The color determining unit 400 may determine different colors according to previously divided sections from the first dynamic guideline image information decoded in the decoder unit 300. Here, sections for determining the colors may be determined by using section identifying information such as section numbers or the like, included when the first dynamic guideline image information is encoded.

The color register unit 500 may provide color information for each section determined in the color determining unit 400. Here, the color register may be an R/G/B register or a Y/Cb/CR register.

The image synthesizing unit 600 may synthesize second dynamic guideline image information determined to have different colors according to the divided sections in the color determining unit 400 and an image input from a rear camera to thereby output the synthesized image.

Referring to FIG. 3, the image synthesizing unit 600 may include an active pixel determining unit 610 determining active pixels and inactive pixels among the second dynamic guideline image information having different colors according to sections, the active pixels being synthesized with the image inputted from the rear camera and the inactive pixels not being synthesized therewith. The active pixels and the inactive pixels may be set to form a lattice form in a transversal pixel direction and a longitudinal pixel direction of the second dynamic guideline image information.

In addition, the image synthesizing unit 600 may further include a synthesizing region filtering unit 630. The synthesizing region filtering unit 630 may low-pass filter the second dynamic guideline image information having different colors according to sections to thereby synthesize the low pass filtered second dynamic guideline image information with the image inputted from the rear camera. The synthesizing region filtering unit 630 may also low-pass filter active pixels among the second dynamic guideline image information having different colors according to sections to thereby synthesize the low pass filtered acitive pixels with the image inputted from the rear camera.

The apparatus for processing an on-screen display (OSD) according to the first embodiment of the present invention may not include a flicker setting unit 620 shown in FIG. 3.

Figure 2:
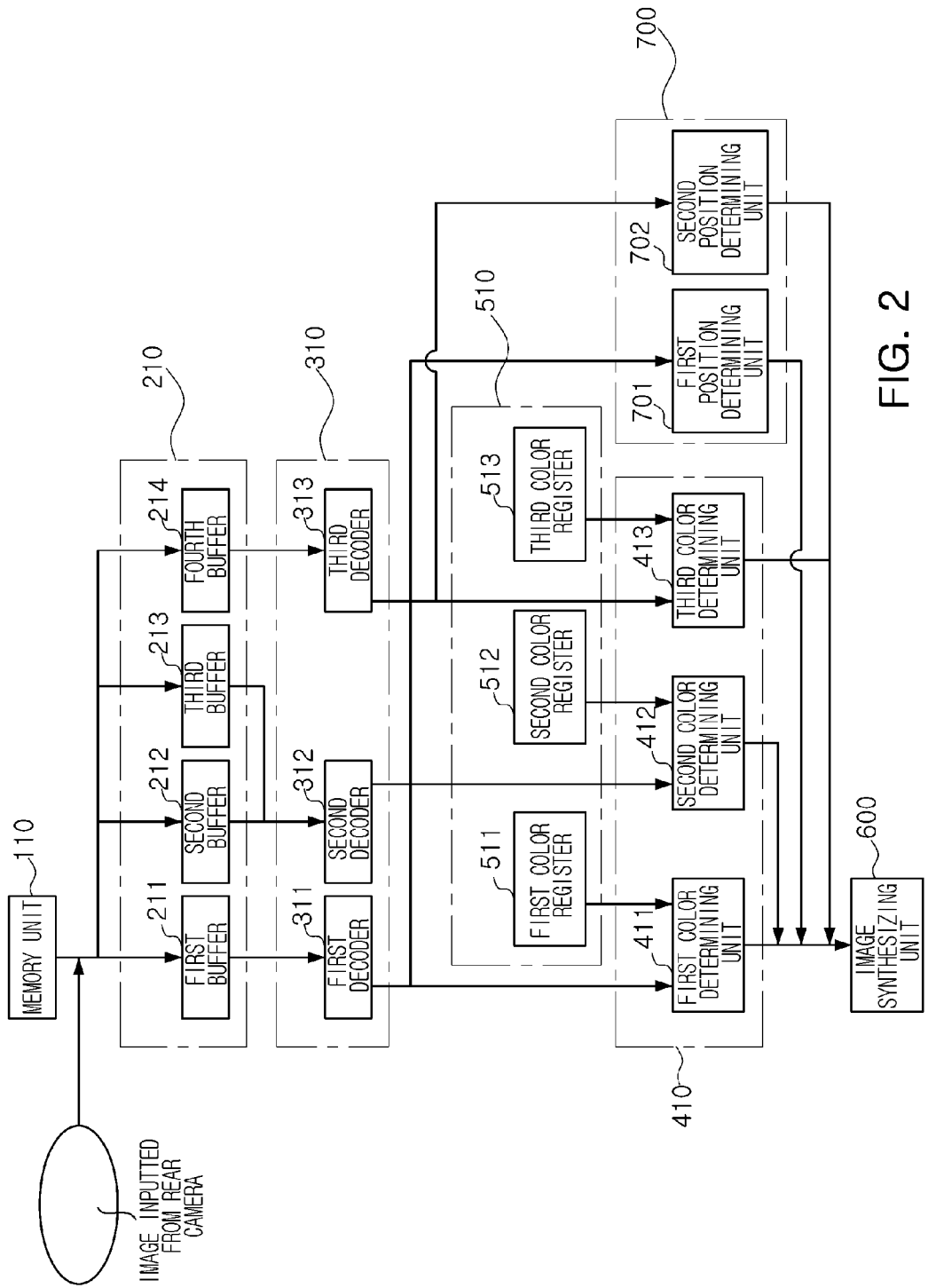
FIG. 2 is a configuration diagram of an apparatus for processing an OSD according to a second embodiment of the present invention.

FIG. 2 is a configuration diagram of an apparatus for processing an OSD according to a second embodiment of the present invention; and FIG. 3 is a detailed view of the image synthesizing unit 600.

Referring to FIG. 2, an apparatus for processing an OSD according to the second embodiment of the present invention may include a memory unit 110, a buffer unit 210, a decoder unit 310, a color determining unit 410, a color register unit 510, a position determining unit 700, and an image synthesizing unit 600.

The memory unit 110 may have first static guideline image information, first dynamic guideline image information, and first message image information stored therein. The first static guideline image information may be information in which bitmap images of a static guideline are encoded. Here, the first dynamic guideline image information may be information in which a plurality of bitmap images corresponding to a plurality of steering wheel steering angles are encoded. The first message image information may be information in which bitmap images of various messages such as a message warning that an obstacle exists in the rear, or the like, are encoded. Here, the encoding may be performed by a run length encoding method. In addition, the first dynamic guideline image information may be information in which a guideline is divided into predetermined sections and is encoded together with section identifying information such as a section number, or the like.

The buffer unit 210 may include a first buffer 211 temporally storing the first static guideline image information read from the memory unit 110 therein, a second buffer 212 receiving the first dynamic guideline image information corresponding to a current steering wheel steering angle, a third buffer 213 receiving third dynamic guideline image information corresponding to the next steering wheel steering angle estimated from the current steering wheel steering angle, and a fourth buffer 214 temporally storing the first message image information.

The decoder unit 310 may decode the first dynamic guideline image information outputted from the buffer unit 210. Here, the decoding may be performed by a run length decoding method. Here, the decoder unit 310 may include a first decoder 311 run-length decoding the first static guideline image information outputted from the first buffer 211 to thereby output the decoded first static guideline image information to the color determining unit 410, a second decoder 312 run-length decoding the first dynamic guideline image information outputted from the second and third buffers 212 and 213 to thereby output the decoded first dynamic guideline image information to the color determining unit 410, and a third decoder 313 run-length decoding the first message image information output from the fourth buffer 214 to thereby output the decoded first message image information to the color determining unit 410.

The color determining unit 410 may include a first color determination unit 411 determining different colors according to the previously divided sections from the first static guideline image information, a second color determination unit 412 determining different colors according to the previously divided sections from the first dynamic guideline image information, and a third color determination unit 413 determining a color of the first message image information. Here, the first static guideline image information, the first dynamic guideline image information, and the first message image information are respectively decoded in the decoder unit 310. The first color determination unit 411 may determine the color according to the section by counting horizontal synchronous signals (Hsync) of the first static guideline image information, and the second color determination unit 412 may determine the color by using section identifying information such as section numbers, or the like, included when the first dynamic guideline image information is encoded.

The color register unit 510 may provide color information for each of the sections determined in the color determining unit 410 and include a first color register 511 associated with the first color determination unit 411, a second color register 512 associated with the second color determination unit 412, and a third color register 513 associated with the third color determination unit 413. Here, each of the color registers may be an R/G/B register or a Y/Cb/CR register.

The image synthesizing unit 600 may synthesize second static guideline image information, and second dynamic guideline image information determined to have different colors according to the divided sections in the color determining unit 510, and second message image information and an image inputted from a rear camera to thereby output the synthesized image.

Referring to FIG. 3, the image synthesizing unit 600 may include the active pixel determining unit 610 determining active pixels and inactive pixels among the second static guideline image information and the second dynamic guideline image information that have different colors according to sections and the second message image information having a determined color, the active pixels being synthesized with the image inputted from the rear camera and the inactive pixels not being synthesized therewith. The active pixels and the inactive pixels may be set to form a lattice form in a transversal pixel direction and a longitudinal pixel direction of each of the image information.

The image synthesizing unit 600 may include the flicker setting unit 620 controlling a time interval at which active pixels of the second message image information are synthesized with an image inputted from the rear camera such that the second message image information is outputted on a screen while flickering thereon.

In addition, the image synthesizing unit 600 may further include the synthesizing region filtering unit 630. The synthesizing region filtering unit 630 may low pass filter the second static guideline image information and the second dynamic guideline image information that have different colors according to sections and the second message image information having a determined color, such that the second static guideline image information, the second dynamic guideline image information and the second message image information may be synthesized with the image inputted from the rear camera.

Alternatively, the synthesizing region filtering unit 630 may low pass filter active pixels of the second static guideline image information, the second dynamic guideline image information, and the second message image information having a determined color, such that the active pixels are synthesized with the image inputted from the rear camera.

Figure 4:
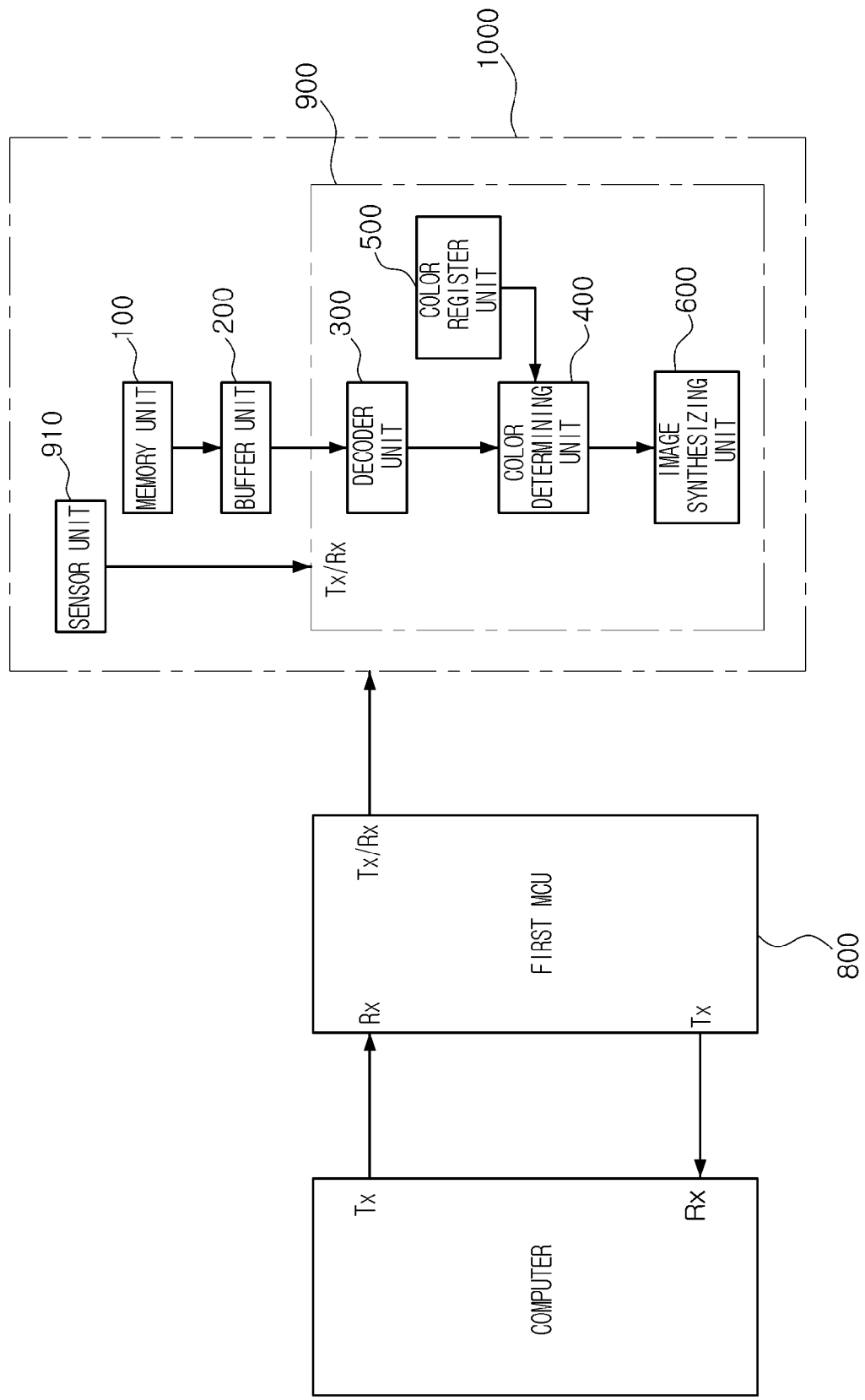
FIG. 4 is a configuration diagram of a system for reprogramming a camera module according to an embodiment of the present invention.

FIG. 4 is a configuration diagram of a system for reprogramming a camera module according to an embodiment of the present invention.

Referring to FIG. 4, the memory unit 100, the buffer unit 200, the decoder unit 300, the color determining unit 400, the color register unit 500, and the image synthesizing unit 600 described with reference to FIG. 1 may be included in a rear camera module. In addition, the decoder unit 300, the color determining unit 400, the color register unit 500, and the image synthesizing unit 600 may be included in a second microcontroller unit (MCU) 900. The second MCU 900 may further include a sensor unit 910 processing the image input from the rear camera.

The rear camera module including the second MCU 900 may transmit data to and receive the data from a first MCU 800 through a single bus in a half-duplex scheme. The first MCU 800 may transmit data to and receive the data from a computer in a full-duplex scheme.

Figure 5A:
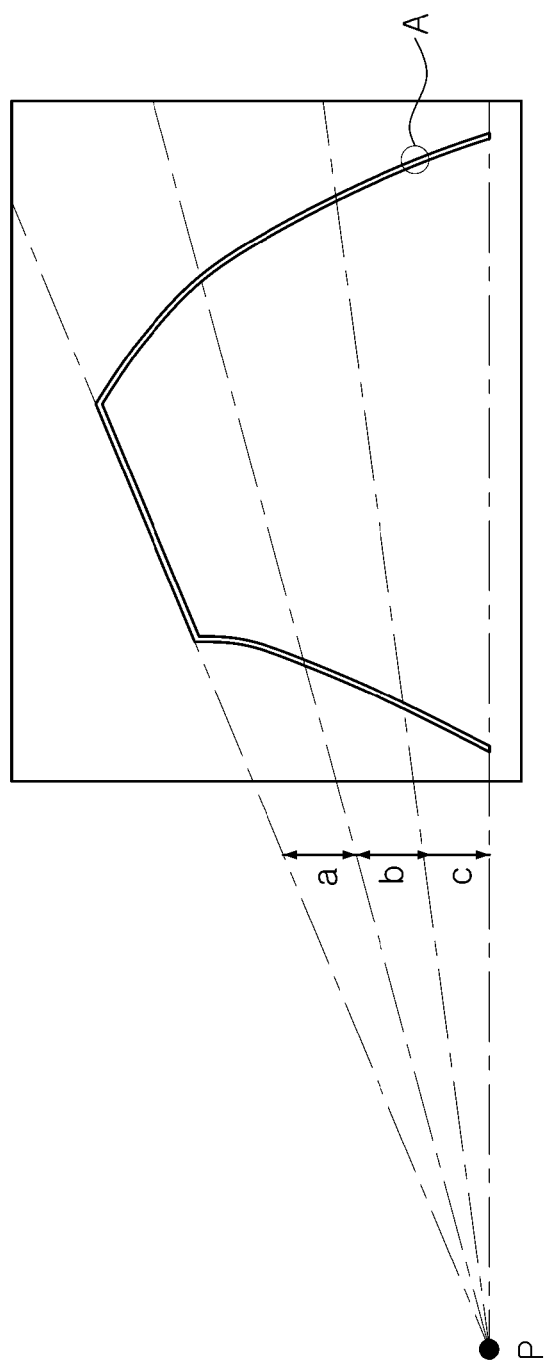
FIGS. 5A through 5D show an OSD implemented for each image information to be processed by an apparatus for processing an OSD according to the embodiments of the present invention and an image inputted from a rear camera.
Figure 5B:
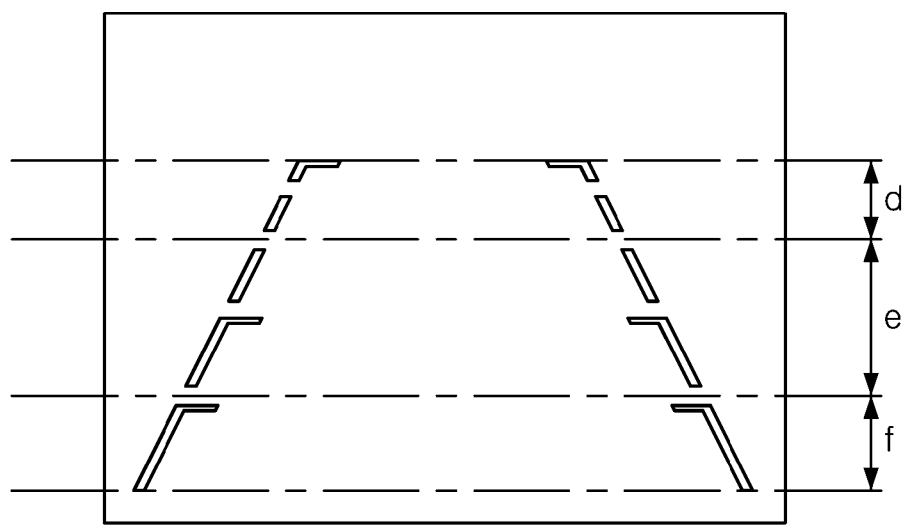
Figure 5C:
Figure 5D:

FIGS. 5A through 5D show an OSD implemented for each image information to be processed by an apparatus for processing an OSD according to the first and second embodiment of the present invention and an image inputted from a rear camera. More specifically, FIG. 5A shows first dynamic guideline image information; FIG. 5B shows first static guideline image information; FIG. 5C shows first message image information; and FIG. 5D shows second static guideline image information, second dynamic guideline image information, and second message image information synthesized with an image inputted from a rear camera.

Figure 6:
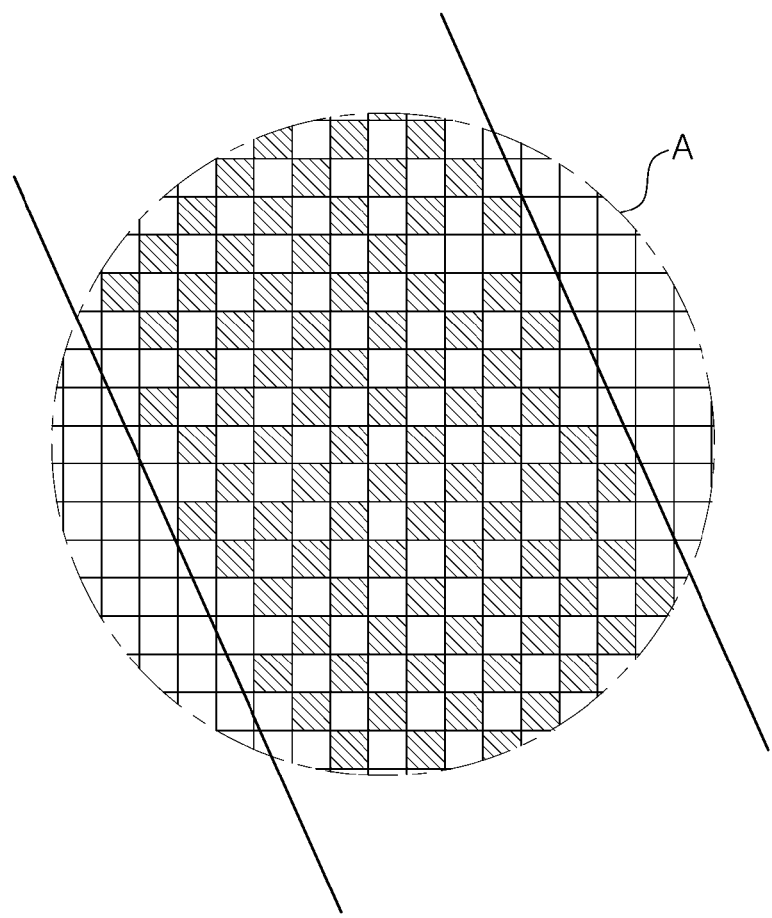
FIG. 6 is an enlarged view of part A of FIG. 5A for describing an active pixel determining unit according to the embodiment of the present invention.

FIG. 6 is an enlarged view of part A of FIG. 5A for describing an active pixel determining unit according to the embodiment of the present invention. Oblique line portions among quadrangles in the form of a lattice indicate active pixels, and the remaining portions indicate inactive pixels.

Hereinafter, the operations and effects of the present invention will be described in detail with reference to the accompanying drawings.

The apparatus for processing an OSD according to the first embodiment of the present invention will be described with reference to FIGS. 1, 3, 5A and 6.

Referring to FIG. 1, the memory unit 100 may have the first dynamic guideline image information stored therein. The first dynamic guideline image information may be information in which guideline bitmap images corresponding to steering wheel steering angles and having a curved shape are run-length encoded as shown in FIG. 5A. In addition, the first dynamic guideline image information may be information in which a guideline is divided into a section a, a section b, and a section c at a predetermined angle based on a point P and is encoded together with information such as section numbers or the like, inputted for each section while having n bits in a storing memory, as shown in FIG. 5A. This encoded information may be used in determining colors for respective sections in the color determining unit 400 to be described below. The divided sections a, b, and c are only examples, and the number of sections or the like may be variously changed.

The first dynamic guideline image information encoded as described above and stored in the memory is inputted to the buffer unit 200. The buffer unit 200 may include a first buffer (not shown) receiving the dynamic guideline image information corresponding to a current steering wheel steering angle and a second buffer (not shown) receiving third dynamic guideline image information corresponding to the next steering wheel steering angle estimated from the current steering wheel steering angle. A predetermined time is required to load the first dynamic guideline image information from the memory unit. Since the dynamic guideline image information to be implemented in the OSD is continuously changed in real time according the steering wheel steering angles, the dynamic guideline image information displayed on a screen may not be displayed while being smoothly continued when a plurality of buffers do not exist. Therefore, the apparatus for processing an OSD according to the first embodiment of the present invention uses the first and second buffers (not shown) or the plurality of buffers (not shown), whereby the dynamic guideline image information displayed on the screen may be smoothly continued.

The first dynamic guideline image information outputted from the buffer unit 200 may be run-length decoded in the decoder unit 300.

The Color of each section may be determined in the color determining unit 400 such that the sections a, b, and c previously divided from the dynamic guideline image information decoded in the decoder unit 300 have different respective colors. Here, sections a, b, and c for determining colors may be determined by using information such as section numbers, or the like, included when the first dynamic guideline image information is encoded. More specifically, when the first dynamic guideline image information is encoded, the sections a, b, and c are divided and section identifying information such as section numbers, or the like, is included in each section. The first dynamic guideline image information is decoded in the decoder unit 300, such that section identifying information such as section numbers, or the like, may be recognized by the color determining unit. Therefore, the color for each section may be determined as colors predetermined in the color determining unit 400 based on section identifying information such as section numbers, or the like, or corresponding to user inputs. Color information may be provided by the color register unit 500.

Therefore, the apparatus for processing an OSD according to the first embodiment of the present invention may the dynamic guideline image information having different colors for each of the sections according to distances from the rear of a vehicle.

The second dynamic guideline image information having different colors according to the sections may be synthesized with an image inputted from a rear camera to be thereby outputted in the image synthesizing unit 600.

Referring to FIG. 3, the image synthesizing unit 600 may include the active pixel determining unit 610 determining active pixels such that the second dynamic guideline image information having different colors according to sections does not completely obscure the image inputted from the rear camera and the synthesizing region filtering unit 630 smoothly processing a region in which the second dynamic guideline image information is synthesized with the image inputted from the rear camera.

The active pixel determining unit 610 may determine active pixels and inactive pixels among the second dynamic guideline image information having different colors according to sections, the active pixels being synthesized with the image inputted from the rear camera and inactive pixels not being syntheszed therewith. Referring to FIG. 6, the active pixels that have oblique lines and the inactive pixels that do not have the oblique lines may be set to form a lattice in a transversal pixel direction and a longitudinal pixel direction of the second dynamic guideline image information. Here, the above-mentioned lattice form may be an example and various modifications thereof may be made. For example, a lattice may be formed to have several pixel intervals. In addition, a quadrangle indicating each pixel has been slightly exaggerated in order to assist in understanding the present invention.

Therefore, only the active pixels of the second dynamic guideline image information having different colors according to sections are displayed on the screen due to the active pixel determining unit 610, whereby the image inputted from the rear camera may not be completely screened.

The synthesizing region filtering unit 630 may low pass filter the active pixels among the second dynamic guideline image information having different colors according to sections to thereby synthesize the low pass filtered active pixels with the image inputted from the rear camera.

The apparatus for processing an OSD according to the second embodiment of the present invention will be described with reference to FIGS. 2, 3, 5B and 5C.

The apparatus for processing an OSD according to the second embodiment of the present invention processes the first static guideline image information, the first dynamic guideline image information, and the first message image information. In descriptions regarding individual components of the apparatus for processing an OSD according to the second embodiment of the present invention, since a description regarding the processing of the first dynamic guideline image information has been provided in the above-mentioned embodiment, it will be omitted.

Referring to FIG. 2, the first static guideline image information may be inputted from the memory unit 110 to the first buffer unit 211 and then be decoded in the first decoder 311. Here, the first static guideline image information may be information in which guideline bitmap images in the form shown in FIG. 5B are run-length encoded. The first static guideline image information decoded in the first decoder 311 may be inputted to the first color determination unit 411. Here, the decoding may be performed by a run length decoding method.

The first color determination unit 411 may determine that divided sections such as d, e, and f shown in FIG. 5B have different colors by receiving information from the first color register 511. Here, the sections d, e, and f shown in FIG. 5B are only examples, and the number of sections or the like may be variously changed. The colors for the divided sections may be determined by using the horizontal synchronous signals (Hsync) of the first static guideline image information. That is, a method of counting the horizontal synchronous signals to thereby determine that the divided sections have different colors before and after a preset reference count value may be used.

In this manner, the first color determination unit 411 may determine the colors for each of the divided sections with respect to the first static guideline image information, and at the same time, a first position determining unit 701 may determine a position in which the second static guideline image information is to be displayed, in the image inputted from the rear camera. The left and right positions and the upper and lower positions in the static guideline image information as shown in FIG. 5B may be determined. To this end, the horizontal synchronous signals (Hsync) may be used. More specifically, the upper and lower positions may be determined by counting the horizontal synchronous signals, and the left and right positions may be determined by counting the pixel values of the horizontal synchronous signals.

The first dynamic guideline image information may be inputted from the memory unit 110 to the second and third buffer 212 and 213, synchronized with other information and then decoded in the second decoder 312. The colors of the decoded information may be determined for the sections previously divided in the second color determination unit 412 by using information of the second register 512. A detailed description for individual components will be replaced by the descriptions for individual components of the apparatus for processing an OSD according to the first embodiment of the present invention.

The first message image information may be inputted from the memory unit 110 to the fourth buffer 214 and then decoded in the third decoder 313. Here, the first message image information may be information in which bitmap images in the form shown in FIG. 5C are run length encoded. The message image information decoded in the third decoder 313 may be inputted to the third color determination unit 413. Here, the decoding may be performed by a run length decoding method.

The third color determination unit 413 may determine the color of the first message image information by using information from the third color register 513.

The third color determination unit 413 may determine the color of the message image information, and at the same time a second position determining unit 702 may determine a position in which the second message image information is to be displayed, in the image inputted from the rear camera. third color determination unit To this end, the horizontal synchronous signals may be used. The upper and lower positions of the second message image information may be determined by counting the horizontal synchronous signals.

As described above, the static guideline image information, the dynamic guideline image information, and the message image information of which the colors and the positions are determined in the individual components of the apparatus for processing an OSD according to the second embodiment of the present invention are inputted to the image synthesizing unit 600. The image synthesizing unit 600 may synthesize each of the static guideline image information, the dynamic guideline image information, and the message image information with the image inputted from the rear camera to thereby output the synthesized image.

Referring to FIG. 3, the image synthesizing unit 600 may include the active pixel determining unit 610, the flicker setting unit 620, and the synthesizing region filtering unit 630. A detailed description regarding the active pixel determining unit 610 and the synthesizing region filtering unit 630 will be replaced by the description thereof in the apparatus for processing an OSD according to the first embodiment of the present invention.

The flicker setting unit 620 may control a time interval at which the active pixels of the second message image information are synthesized with the image inputted from the rear camera such that the message image information is outputted on a screen while flickering thereon. That is, the flicker setting unit 620 may count vertical synchronous signals (Vsync), to thereby allow the second message image information to be flickered.

FIG. 4 is a configuration diagram of a system for reprogramming a camera module according to an embodiment of the present invention;

Referring to FIG. 4, the memory unit 100, the buffer unit 200, the decoder unit 300, the color determining unit 400, the color register unit 500, and the image synthesizing unit 600 that have been described with reference to FIG. 1 may be included in a rear camera module 1000. In addition, the decoder unit 300, the color determining unit 400, the color register unit 500, and the image synthesizing unit 600 may be included in a second microcontroller unit (MCU) 900. The second MCU 900 may further include a sensor unit 910 processing the image inputted from the rear camera.

The rear camera module 1000 including the second MCU 900 may transmit data to and receive the data from a first MCU 800 through a single bus in a half-duplex scheme. The first MCU 800 may transmit data to and receive the data from a computer in a full-duplex scheme.

When a data stream is transmitted from a TX terminal of the computer to the first MCU 800, the first MCU 800 may transmit the data stream to the camera module 1000 connected to the single bus in the half-duplex scheme. The camera module 1000 may check validity of the data stream, that is, an OP code, a data length, or the like, and transmit an error message to the first MCU 800 when the data stream is invalid. In this case, the first MCU 800 may transfer the error message to the computer. When the data stream is valid, the camera module 1000 may reprogram target components such as the sensor unit 910, the color register unit 500, or the like, therein.

The system for reprogramming a camera module is implemented as described above to thereby connect the rear camera to a computer using a universal asynchronous receiver and transmitter communication (UART) scheme by using an extra pin that is not generally used in the rear camera, whereby the camera module may be reprogrammed.

As set forth above, according to the embodiments of the present invention, a user may freely set the colors of a warning message, a static guideline, and a dynamic guideline, whereby the warning message, the static guideline, and the dynamic guideline can be displayed on a screen without obscuring a rearview image. In addition, a dynamic guideline can be set to have different colors according to sections divided into distances from the rear of a vehicle and an image can be continuously displayed. Further, the camera module can be reprogrammed.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for processing an on-screen display (OSD), the apparatus comprising:
   a buffer unit receiving first dynamic guideline image information; a color determining unit determining colors for previously divided sections included in the first dynamic guideline image information from the buffering unit; and an image synthesizing unit synthesizing second dynamic guideline image information having the colors for each of the sections, determined by the color determining unit with an image from a camera; Wherein the color determining unit determines the colors by using section identifying information, allowing for user input, stored according to the sections included in the first dynamic guideline image information.

2. The apparatus of claim 1, wherein the image synthesizing unit includes an active pixel determining unit determining active pixels among the second dynamic guideline image information having the colors for each of the sections, determined by the color determining unit, the active pixels being synthesized with the image from the camera.

3. The apparatus of claim 2, wherein the active pixel determining unit determines the active pixels and inactive pixels among the second dynamic guideline image information having the colors for each of the sections determined by the color determining unit, in a lattice form, the inactive pixels not being synthesized with the image from the camera.

4. The apparatus of claim 1, wherein the buffer unit includes:
   a first buffer receiving the first dynamic guideline image information corresponding to a steering wheel steering angle; and
   a second buffer receiving third dynamic guideline image information corresponding to the next steering wheel steering angle estimated from the steering wheel steering angle.

5. The apparatus of claim 1, further comprising a decoder unit run-length decoding the first dynamic guideline image information from the buffer unit to thereby output the decoded first dynamic guideline image information to the color determining unit.

6. The apparatus of claim 1, further comprising a color register unit providing color information corresponding to the section identifying information to the color determining unit.

7. The apparatus of claim 1, wherein the image synthesizing unit includes a synthesizing region filtering unit low pass filtering the second dynamic guideline image information having the colors for each of the sections.

\* \* \* \* \*